(12) United States Patent  
Bohmbach et al.

(10) Patent No.: US 11,346,391 B2  
(45) Date of Patent: May 31, 2022

(54) DUAL SWIVEL CLIP

(71) Applicant: Tenacious Holdings, Inc., St. Paul, MN (US)

(72) Inventors: Nathan Bohmbach, Lakeville, MN (US); Jeffery Popowski, Roseville, MN (US)

(73) Assignee: Tenacious Holdings, Inc., St. Paul, MN (US)

( * ) Notice: Subject to any disclaimer, the term of this patent is extended or adjusted under 35 U.S.C. 154(b) by 0 days.

(21) Appl. No.: 17/085,952

(22) Filed: Oct. 30, 2020

(65) Prior Publication Data

US 2021/0131485 A1 May 6, 2021

Related U.S. Application Data

(63) Continuation-in-part of application No. 29/709,274, filed on Oct. 12, 2019, now Pat. No. Des. 914,482.

(60) Provisional application No. 62/928,103, filed on Oct. 30, 2019.

(51) Int. Cl.
| | |
|---|---|
| *F16C 11/06* | (2006.01) |
| *F16B 2/22* | (2006.01) |
| *A45F 5/02* | (2006.01) |

(52) U.S. Cl.
CPC ............ *F16C 11/0614* (2013.01); *F16B 2/22* (2013.01); *A45F 5/02* (2013.01)

(58) Field of Classification Search
CPC .. F16B 2/22; Y10T 24/3447; Y10T 24/44274; F16V 11/0614
See application file for complete search history.

(56) References Cited

U.S. PATENT DOCUMENTS

| | | | | |
|---|---|---|---|---|
| D368,169 | S | * | 3/1996 | Coker ........................... D6/315 |
| 5,655,270 | A | * | 8/1997 | Boisvert ................... A45F 5/02 24/301 |
| 7,213,307 | B2 | * | 5/2007 | Votel ....................... A45F 5/004 24/336 |
| 8,341,808 | B2 | * | 1/2013 | Vermillion ................ F16B 2/22 24/336 |
| 9,375,074 | B2 | * | 6/2016 | Moreau ..................... A45F 5/02 |

* cited by examiner

*Primary Examiner* — Robert Sandy
(74) *Attorney, Agent, or Firm* — Skaar Ulbrich Macari, P.A.

(57) ABSTRACT

A dual swivel clip comprising two clips connected by a flexible elongated link having spheroid ends; one spheroid end being hollow and the other solid. When under stress, the dual swivel clip is configured to allow the hollow spheroid to separate from the clip assembly at a predictable application of force to avoid unpredictable and unsafe breaking of the dual swivel clip, thus avoiding the unintended and unsafe introduction of stay parts into the environment.

2 Claims, 5 Drawing Sheets

DUAL SWIVEL CLIP

CLAIM OF BENEFIT TO PRIOR APPLICATION

This application claims the benefit of U.S. Provisional Application No. 62/928,103, filed Oct. 30, 2019; and such application is hereby fully incorporated by reference herein. This application is also a continuation-in-part of U.S. Design application Ser. No. 29/709,274 filed Oct. 12, 2019.

FIELD OF THE INVENTION

This invention relates to clips, particularly dual clips connected by a flexible link. Such clips are useful at job sites and other locations for retaining gloves, rags and other personal objects.

BACKGROUND

Dual clips that are connected by a flexible link are known and have many useful attributes. One end of the dual clip is commonly attached to a belt loop or other item of clothing while the other end is clipped to an item that is desired to be kept at hand for ease of use. Rags, gloves and other personal items are often retained in this manner. These clips are used in a wide variety of industries and locations including construction sites, manufacturing plants and in the service industry.

The prior art dual clip design, however, does pose certain hazards. Items hanging loosely from a user can be inadvertently caught up in machinery or otherwise snagged causing stress on the clip assembly. When the stress is great enough the clip can fail. The prior art dual clip designs fail unpredictably. The Glove Clip with Dual Clips, Model #30LU77 from Grainger is a good example (see FIG. 5). The flexible link between the clip bodies is not designed to release predictably under stress. The shape of the ends of the link are typically cone shaped, wherein the wide part of the cone is configured so that the link is resistant to releasing from the clip body under undue stress and will thus fail unpredictably. Under undue stress it is typical that the link itself will fail and break into multiple parts. Further, there are retaining teeth that support the cone ends of the links that often break off at failure, and the clips themselves may break into multiple pieces. If the failure happens quickly and under significant force, parts of the failed clip assembly may be expelled into the environment and at high rates of speed causing injury and creating unwanted debris.

Thus there is a need for a safer design that can more readily protect a user from personal injury when using a dual clip tether.

SUMMARY

A safer dual clip design is herein disclosed. The link between the clips disclosed herein continues to provide the swiveling and articulation as needed for use, but presents a safer design using spheroid shapes at the distal ends of the link. The spheroid shaped ends are used at the end of the flexible link to connect the two clips. One end of the link comprises a hollow spheroid end and the other end of the link comprises a solid spheroid end. The design is made to insure that the hollow spheroid end release from the clip before the solid spheroid end releases, or before the link otherwise breaks, insuring the first failure under undue stress results in the hollow spheroid end predictably deforming and releasing from the clip to which it was attached. The assembled dual clip design also requires no teeth or other small retaining parts that can be inadvertently introduced into the environment that might cause a safety hazard.

DESCRIPTION OF THE PREFERRED EMBODIMENTS

Figure 1:
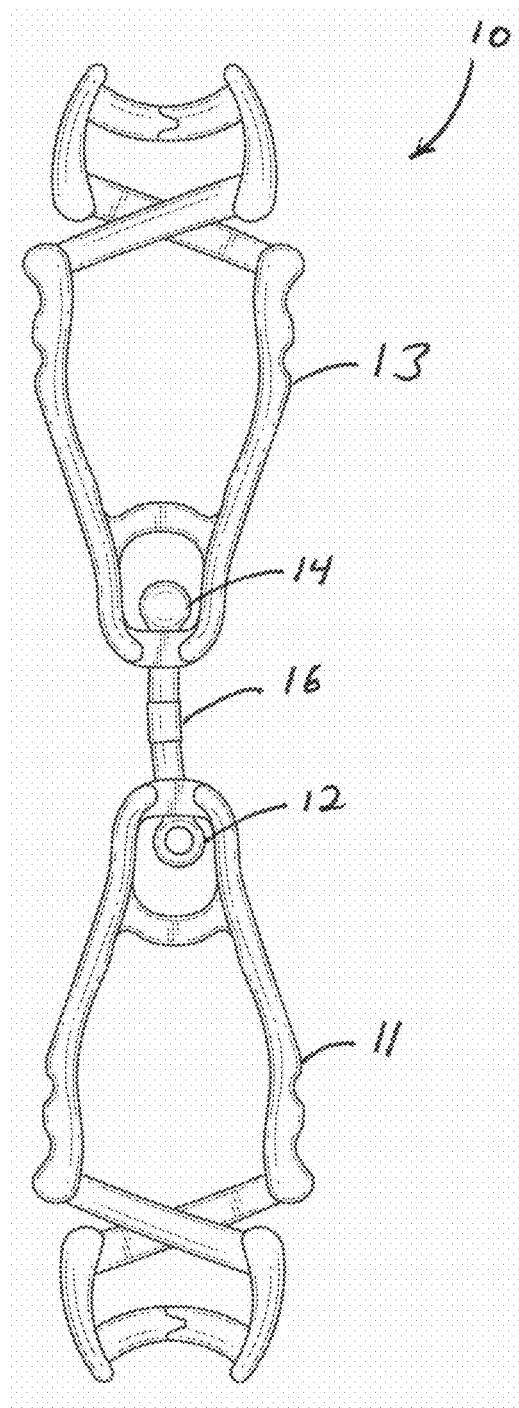
FIG. 1 is a depiction of the fully assembled DUAL SWIVEL CLIP showing the flexible link and the spheroid link ends, one hollow and one solid.
Figure 2:
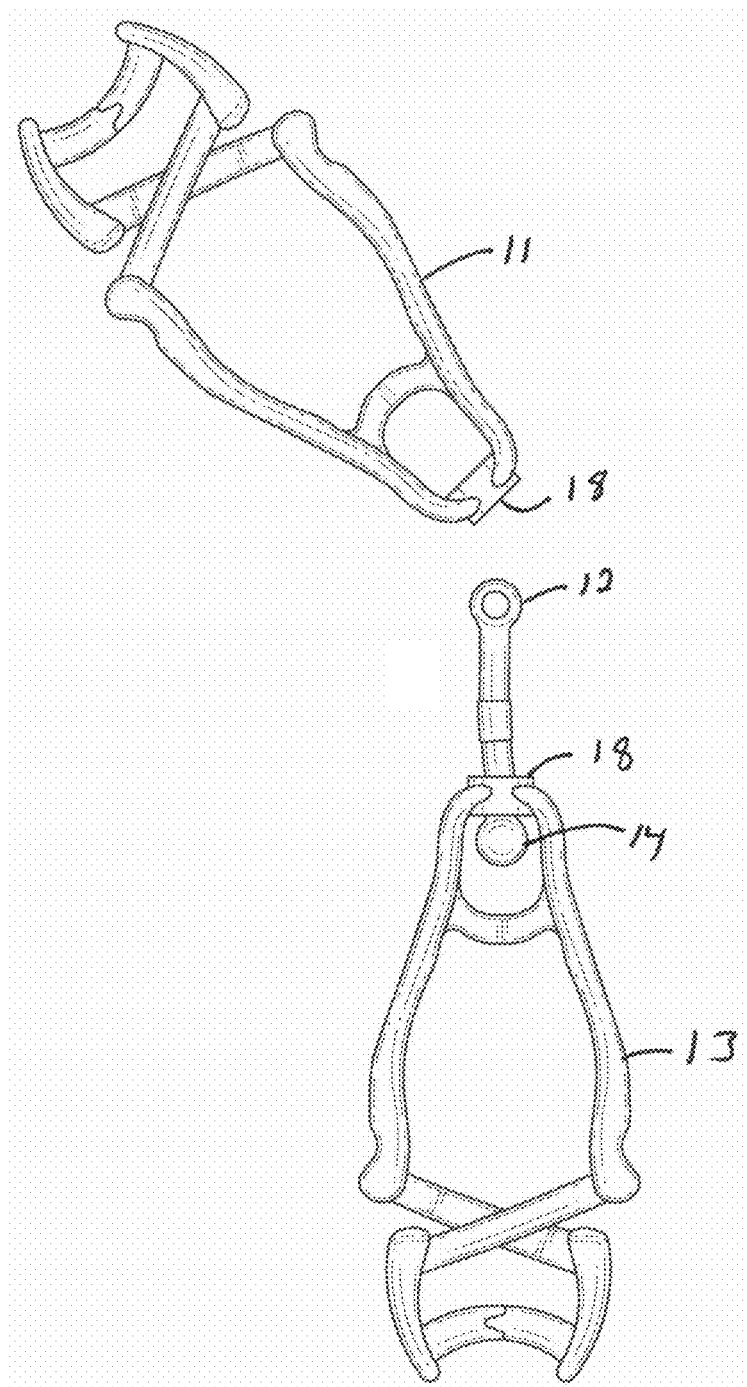
FIG. 2 is a depiction of the invention where the hollow spheroid end is separated from the clip to which it was secured.
Figure 3:
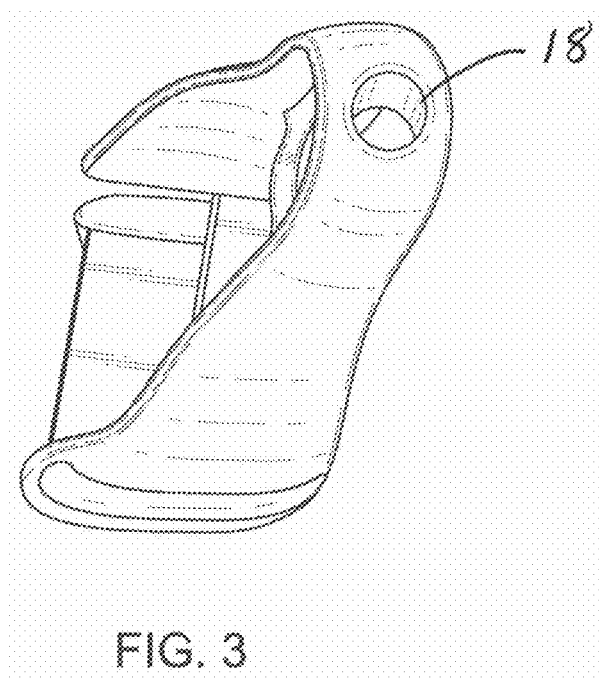
FIG. 3 is a depiction of a single clip showing the aperture configured to capture one of the spheroid ends of the link.
Figure 4:
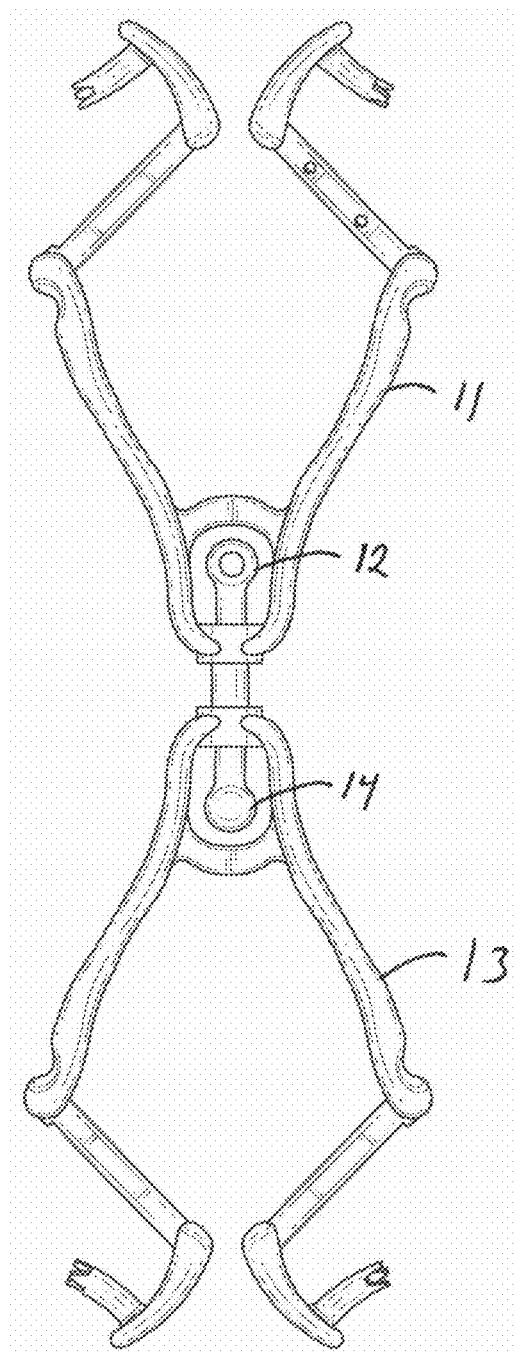
FIG. 4 is a depiction of the fully assembled invention wherein the clips have been released.
Figure 5:
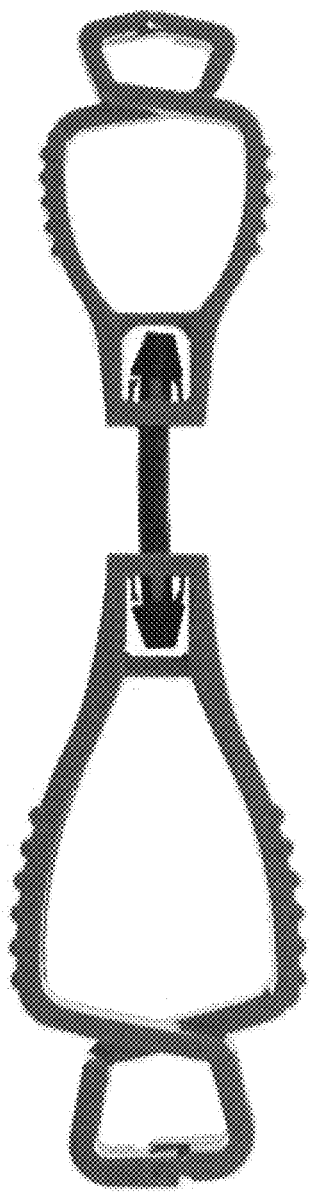
FIG. 5 is a depiction of prior art.

Referring to FIGS. 1-4, the dual clip invention disclosed herein is depicted. Dual clip 10 comprises clip 11 and clip 13. The assembled dual clip 10 comprises flexible link 16. Each end of flexible link 16 is terminated by a spheroid. One end of flexible link 16 is terminated by a solid spheroid 14, while the other end of flexible link 16 is terminated by a hollow spheroid 12. Each clip has a retaining aperture 18, best seen in FIG. 3. When assembled, spheroids 12 and 14 are pressed into each clips retaining aperture 18. Apertures 18 are sized and configured such that the spheroids cannot release through apertures 18 unless a certain amount of force is applied to separate clip 13 from clip 11. Preferably hollow spheroid 12 will not pass through aperture 18 with less than ten pounds of weight applied in attempting to pull spheroid 12 directly through aperture 18. Preferably solid spheroid 14 will not pass through aperture 18 with less than 26 pounds of weight applied in attempting to pull spheroid 14 directly through aperture 18. Link 16, including spheroid ends 12 and 14, will preferably will not separate or otherwise destruct under a direct weight of less than 30 pounds. Link 16, including spheroid ends 12 and 14, is preferably made of thermoplastic polyurethane (TPU).

While the invention has been described in connection with what is presently considered to be the most practical and preferred embodiments, it will be apparent to those of ordinary skill in the art that the invention is not to be limited to the disclosed embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products. Moreover, features or aspects of various example embodiments may be mixed and matched (even if such combination is not explicitly described herein) without departing from the scope of the invention.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. A dual swivel clip comprising:
a first clip having a first end and a second end;
a second clip having a first end and a second end;

the first clip first end being configure to clip to and hold an object;

the second clip first end being configure to clip to and hold an object;

an elongated flexible link having a first end and a second end;

the elongated flexible link first end comprising a solid spheroid;

the elongated flexible link second end comprising a hollow spheroid;

the first clip second end defining an aperture configured to frictionally accept the hollow spheroid end of the elongated flexible link;

the second clip second end defining an aperture and configured to frictionally accept the solid spheroid end of the elongated flexible link; and, wherein when increasing weight tending to separate the first clip away from the second clip is applied, the hollow spheroid end of the elongated flexible link will release from the aperture of the first clip second end before the solid spheroid end of the elongated flexible link will release from the aperture of the second clip second end.

2. The dual swivel clip of claim 1 wherein the weight applied to the dual swivel clip necessary to separate the hollow spheroid end of the elongated flexible link from the aperture of the first clip second end is greater than 10 pounds.

* * * * *